United States Patent

Dannheim et al.

[11] Patent Number: 6,022,956
[45] Date of Patent: Feb. 8, 2000

[54] WATER-SOLUBLE HALOTRIAZINE-CONTAINING AXO COMPOUNDS, PREPARATION THEREOF AND USE THEREOF AS DYES

[75] Inventors: Jörg Dannheim, Frankfurt am Main; Manfred Hoppe, Kürten, both of Germany

[73] Assignee: Dy Star Textilfarben GmbH & Co. Deutschland KG, Frankfurt, Germany

[21] Appl. No.: 09/307,966

[22] Filed: May 10, 1999

[30] Foreign Application Priority Data

May 13, 1998 [DE] Germany .............................. 198 21 347

[51] Int. Cl.$^7$ .......................... C09B 62/085; D06P 1/382
[52] U.S. Cl. ........................................... 534/638; 534/632
[58] Field of Search .............................................. 534/638

[56] References Cited

U.S. PATENT DOCUMENTS

| 2,979,498 | 4/1961 | Andrew et al. | 534/638 |
| 4,115,378 | 9/1978 | Bien et al. | 534/638 |
| 5,136,028 | 8/1992 | Seiler | 534/638 X |

FOREIGN PATENT DOCUMENTS 14844  9/1980  European Pat. Off. .

*Primary Examiner*—Fiona T. Powers
*Attorney, Agent, or Firm*—Connolly Bove Lodge & Hutz LLP

[57] ABSTRACT

Described are fiber-reactive, water-soluble monoazo compounds conforming to the hereinbelow indicated and defined general formula (1) that are capable of dyeing hydroxyl- and/or carboxamido-containing material, especially fiber material, such as cellulose fibers, for example cotton, or regenerated cellulose fibers and also wool and synthetic polyamide fibers in red shades and in high color strength and good fastnesses.

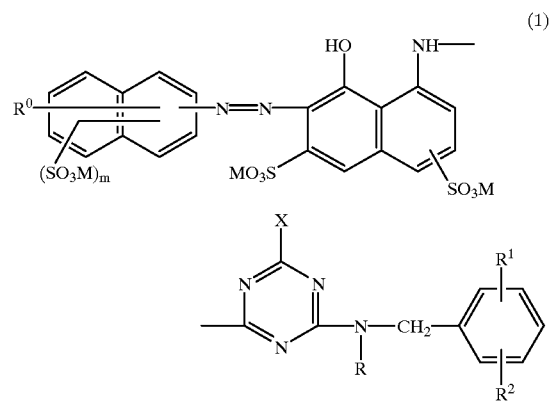

(1)

where M is hydrogen or an alkali metal, m is 1, 2 or 3, X is chlorine or fluorine, $R^0$ is hydrogen or carboxyl, R is alkyl of 1 to 4 carbon atoms which is unsubstituted or substituted by hydroxyl, carboxyl, sulfo, sulfato, phosphate, chlorine, alkanoyloxy of 2 to 5 carbon atoms or alkoxy of 1 to 4 carbon atoms, and R is hydrogen, alkyl of 1 to 4 carbon atoms, which may be substituted, alkoxy of 1 to 4 carbon atoms, which may be substituted, alkanoylamino of 2 to 5 carbon atoms, optionally substituted benzoylamino or halogen, and $R^2$ is hydrogen, carboxyl or sulfo and the —SO$_3$M group in the aminonaphthol radical is disposed meta or para relative to the amino group.

15 Claims, No Drawings

WATER-SOLUBLE HALOTRIAZINE-CONTAINING AXO COMPOUNDS, PREPARATION THEREOF AND USE THEREOF AS DYES

This invention relates to the technical field of fiber-reactive dyes. German Offenlegungsschrift 29 03 594 discloses halotriazine-containing monoazo compounds useful as fiber-reactive dyes for dyeing cellulose fiber materials, for example, but their color strength and build-up characteristics and other dyeing properties are unsatisfactory.

The present invention, then, provides novel monoazo compounds conforming to the general formula (1)

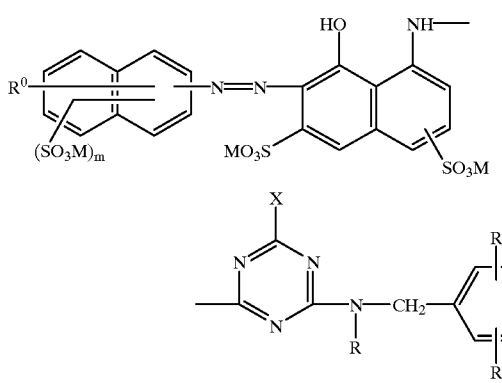

which, although constitutionally very similar to the known compounds mentioned, surprisingly exhibit considerably better dyeing characteristics, for example higher color strength, better build-up characteristics and better washoff of unfixed portions on the dyeing obtained. Furthermore, the novel compounds are preparable in better purity without troublesome by-products.

In the formula (1):

M is hydrogen or an alkali metal, such as sodium, potassium or lithium;

m is 1, 2 or 3;

X is chlorine or fluorine;

$R^0$ is hydrogen or carboxyl;

R is alkyl of 1 to 4 carbon atoms, such as methyl and ethyl, or alkyl of 1 to 4 carbon atoms, such as ethyl, which is substituted by hydroxyl, carboxyl, sulfo, sulfato, phosphato, chlorine, alkanoyloxy of 2 to 5 carbon atoms, such as acetyloxy, or alkoxy of 1 to 4 carbon atoms, such as ethoxy and methoxy, preferably by hydroxyl, methoxy or ethoxy, and is preferably methyl;

$R^1$ is hydrogen, alkyl of 1 to 4 carbon atoms, such as methyl and ethyl, which may be substituted, for example by sulfo or carboxyl, or is alkoxy of 1 to 4 carbon atoms, such as methoxy and ethoxy, or is alkanoylamino of 2 to 5 carbon atoms, such as acetylamino or propionylamino, optionally substituted benzoylamino, such as sulfobenzoylamino, or halogen, such as fluorine, bromine or preferably chlorine, and is preferably hydrogen;

$R^2$ is hydrogen, carboxyl or sulfo, preferably hydrogen; the one —$SO_3M$ group in the aminonaphthol radical is disposed meta or para, preferably meta, relative to the amino group;

the azo group preferably attaches to the sulfonaphthyl radical in the β-position of the naphthalene radical.

Preferred monoazo compounds of the invention are those which conform to the general formula (2)

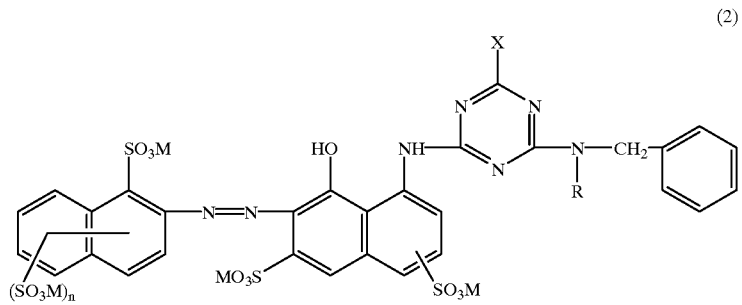

where

R is methyl, ethyl or β-hydroxyethyl, preferably methyl, n is zero, 1 or 2 (when n is zero, this group is hydrogen), and the other elements of the formula are each as defined above.

Sulfo-containing naphthyl radicals which represent the diazo component in the monoazo compounds of the invention include for example 1-sulfonaphth-2-yl, 1,5-disulfonaphth-2-yl, 1,7-disulfonaphth-2-yl, 1,5-disulfonaphth-3-yl, 2,6-disulfonaphth-3-yl, 3,6-disulfonaphth-2-yl, 1,3-disulfo-naphth-7-yl, 1,3-disulfonaphth-6-yl, 1-sulfonaphth4-yl, 1-sulfonaphth-5-yl, 1-sulfonaphth-6-yl, 3,7-disulfonaphth-1-yl, 1,3-disulfonaphth-4-yl, 1,3,5-trisulfonaphth-6-yl, 1,3,6-trisulfonaphth-7-yl, 4,6-disulfonaphth-2-yl, 1,3,6-trisulfonaphth4-yl and 1-sulfo-6-carboxynaphth-2-yl, preferably 1-sulfo-naphth-2-yl, 1,5-disulfonaphth-2-yl and 1,3,7-trisulfonaphth-2-yl.

Formula moieties of the general formula (3)

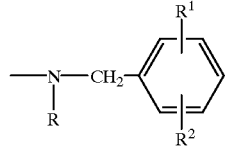

(3)

where R, $R^1$ and $R^2$ are each as defined above, which are present in the monoazo compounds of the general formula (1), include for example N-methylbenzylamino, N-ethylbenzylamino, N-propylbenzylamino, N-butylbenzylamino, N-(β-hydroxyethyl)) benzylamino), N-(β-methoxyethyl)-benzylamino, N-(β-ethoxyethyl)) benzylamino), N-methyl-N-(2-methylbenzyl)-amino, N-methyl-N-(3-methylbenzyl)) amino), N-methyl-N-(4-methylbenzyl)-amino, N-methyl-N-(4-sulfobenzyl)) amino) and N-methyl-N-(4-carboxy-benzyl)amino, preferably N-methylbenzylamino, N-ethylbenzylamino and N-(β-hydroxyethyl)benzylamino.

In the above general formulae and also in the subsequent general formulae, the individual elements of the formulae, whether they bear identical or different designations within any one general formula, can have meanings under their definition which are mutually identical or different.

The terms "sulfo", "carboxyl", "phosphato" and "sulfato" cover not only the acid form but also the salt form of the respective groups. Accordingly, sulfo groups are groups conforming to the general formula —$SO_3M$, thiosulfato groups are groups conforming to the general formula —S—$SO_3M$, carboxyl groups are groups conforming to the general formula —COOM, phosphate groups are groups conforming to the general formula —$OPO_3M_2$ and sulfato groups are groups conforming to the general formula —$OSO_3M$, where each M is as defined above.

The present invention further relates to a process for preparing the monoazo compounds of the general formula (1) according to the invention, which comprises coupling a diazonium salt of an amine of the general formula (4)

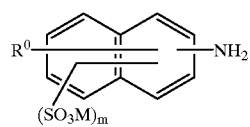

(4)

where $R^0$, M and m are each as defined above, with a compound of the general formula (5)

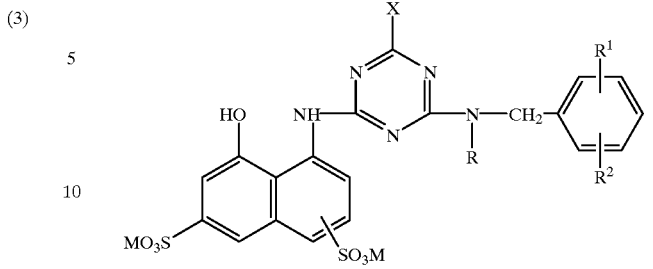

(5)

where M, X, R, $R^1$ and $R^2$ are each as defined above and the one —$SO_3M$ group is disposed meta or para relative to the amino group of the aminonaphthol radical.

The diazotization of the amino compound of the general formula (4) is effected in a conventional manner in hydrochloric acid or sulfuric acid aqueous solution by means of nitrous acid (sodium nitrite) at a pH of below 2.5 and a temperature of from –5° C. to +20° C. The coupling reaction likewise takes place in an aqueous medium and at a pH between 5 and 10, preferably between 6 and 9, and at a temperature between 0 and 20° C., preferably between 5 and 15° C.

The synthesis of the starting compounds of the general formula (5) can be effected in various ways analogously to known procedures for reacting amino compounds with 2,4,6-trifluoro-1,3,5-triazine (cyanuric fluoride) and 2,4,6-trichloro-1,3,5-triazine (cyanuric chloride). One exemplary embodiment comprises reacting especially initially the conventionally prepared 1-(2',4'-dihalo-1',3', 5'-triazin-6'-yl)amino-8-hydroxynaphthalene-3, 6- or 4,6-disulfonic acid in aqueous solution or suspension with an amino compound of the general formula (6)

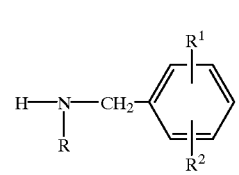

(6)

where R, $R^1$ and $R^2$ are each as defined above, at a pH between 5.0 and 12.5, preferably at a pH between 5.5 and 10, and at a temperature between 0 and 20° C., preferably between 3 and 15° C.

A further possible embodiment of preparing a compound of the general formula (5) comprises initially reacting an amino compound of the general formula (3) with cyanuric fluoride or cyanuric chloride and reacting the resulting dihalotriazine compound with the aminonaphtholsulfonic acid.

Starting compounds of the general formula (4) for synthesizing the monoazo compounds of the invention include for example 2-aminonaphthalene-1-sulfonic acid, 2-aminonaphthalene-1,5-disulfonic acid, 2-aminonaphthalene-1,7-disulfonic acid, 3-aminonaphthalene-1,5-disulfonic acid, 3-aminonaphthalene-2,6-disulfonic acid, 2-aminonaphthalene-3,6-disulfonic acid, 7-aminonaphthalene-1,3-disulfonic acid, 6-aminonaphthalene-1,3-disulfonic acid, 4-aminonaphthalene-1l-sulfonic acid, 5-aminonaphthalene-1-sulfonic acid, 6-aminonaphthalene-1-sulfonic acid, 1-aminonaphthalene-3, 7-disulfonic acid, 4-aminonaphthatene-1,3-disulfonic acid, 6-aminonaphthalene-1,3,5-trisufonic acid, 7-aminonaphthalene-1,3,6-trisulfonic acid, 2-aminonaphthalene4,6-disulfonic acid, 4-aminonaphthalene-1,3,6trisulfonic acid and 2-amino-6-carboxynaphthalene-1-sulfonic acid, preferably 2-aminonaphthalene-1-sulfonic acid, 2-aminonaphthalene-1,5-disulfonic acid and 2-aminonaphthalene-1,3,7-trisulfonic acid.

The separation from their synthesis batches of the monoazo compounds of the general formula (1) prepared according to the present invention is effected by commonly known methods either by precipitating from the reaction medium by means of electrolytes, for example sodium chloride or potassium chloride, or by evaporating the reaction solution, for example by spray drying, in which case this reaction solution may have a buffer substance, for example sodium hydrogenphosphate, added to it.

The monoazo compounds of the general formula (1)—thereinafter referred to as dyes (1)—are useful for dyeing and printing a very wide range of materials, such as silk, leather, wool, nylon fibers and polyurethanes, and especially cellulosic fiber materials of any kind. Such fiber materials include for example the natural cellulose fibers, such as cotton, linen and hemp, and also pulp and regenerated cellulose. The dyes (1) are also useful for dyeing or printing hydroxyl-containing fibers which are present in blend fabrics, for example blends of cotton with polyester fibers or nylon fibers.

The dyes (1) can be applied to the fiber material and fixed on the fiber in various ways, especially in the form of aqueous dye solutions and print pastes. They are suitable not only for the exhaust process but also for dyeing by the pad-dyeing process, whereby the material is impregnated with aqueous, optionally salt-containing dye solutions and the dye is fixed following an alkali treatment or in the presence of alkali, optionally by heating. The dyes of the present invention are particularly useful for the cold pad-batch process, whereby the dye is applied on a pad-mangle together with the alkali and thereafter is fixed by storing at room temperature for several hours. After fixation, the dyes or prints are thoroughly rinsed with cold and hot water, optionally in the presence of an agent which has a dispersing action and promotes the diffusion of the unfixed portions. These dyeing and printing processes are extensively described in the general technical literature and in the patent literature alike, for example in the references cited at the beginning.

The present invention therefore also provides for the use of the dyes (1) for dyeing (including printing) these materials or, to be more precise, processes for dyeing (and printing) such materials in a conventional manner by using a dye (1) as colorant, by applying the dye (1) to the material in an aqueous medium and fixing it on the material by means of heat or by means of an alkaline compound or by means of both.

The dyes (1) are notable for high reactivity, good fixing capability and very good build-up capability. They can therefore be used by the exhaust dyeing process at low dyeing temperatures and require only short steaming times in pad-steam processes. The degrees of fixation are high, and the unfixed portions can be easily washed off after the dyeing process without adjacent white fabric becoming tainted by detaching dye. This results in advantages for the dyeing process; washing cycles and hence costs are saved. The difference between the degree of exhaustion and the degree of fixation is remarkably small and the loss on soaping is thus very small.

The dyes (1) are also particularly useful for printing, especially on cotton, but also for printing nitrogenous fibers, for example wool or silk or blend fabrics comprising wool or silk.

The dyeings and prints prepared with the dyes (1) have (especially on cellulose fiber materials) a high color strength and a high fiber-dye bond stability both in the acidic and in the alkaline range, also good lightfastness and very good wetfastness properties, such as wash, water, seawater, cross-dyeing and perspiration fastnesses, and also good fastness to pleating, hot pressing and crocking.

The examples hereinbelow serve to illustrate the invention. Parts and percentages are by weight, unless otherwise stated. Parts by weight relate to parts by volume as the kilogram relates to the liter.

The compounds described in the examples in terms of a formula are indicated in the form of the free acid; in general, they are prepared and isolated in the form of their alkali metal salts, such as lithium, sodium or potassium salts, and used for dyeing in the form of their salts. The starting compounds and components mentioned in the form of the free acid in the examples hereinbelow, especially table examples, can similarly be used in the synthesis as such or in the form of their salts, preferably alkali metal salts.

The absorption maxima ($\lambda_{max}$) reported in the visible range for the dyes of the invention were determined in aqueous solution on their alkali metal salts. In the table examples, the $\lambda_{max}$ values are given in brackets next to the reported hue; the reported wavelength is in nm.

Example 1 a) 31.9 parts of 1-amino-8-naphthol-3,6-disulfonic acid and 15 parts of 2,4,6-trifluoro-1,3,5-triazine (cyanuric fluoride) are reacted together in accordance with the directions given in European patent application publication No. 0 172 790. The reaction batch is then admixed with 12 parts of N-methylbenzylamine at 10° C., and the reaction is carried out for about two hours at a temperature of 10° C. and at a pH between 7 and 9 with continued stirring (the reported pH range can be maintained by means of aqueous sodium hydroxide solution). After the reaction, a pH of 7 is set by means of aqueous hydrochloric acid and the already partially precipitated compound 1-[2'-fluoro-4'-(N-methyl-N-benzyl)amino-1',3',5'-triazin-6'-yl]amino-3,6-disulfo-8-naphthol is fully isolated as sodium salt by salting out with sodium chloride.

b) To a pH 7 suspension in 500 parts of water of 27 parts of the intermediate used as coupling component under a) is added a hydrochloric acid diazonium salt solution prepared in a conventional manner from 15 parts of 2-aminonaphthalene-1,5-disulfonic acid, and the coupling reaction is carried out at a pH of 7 to 8 (which can be set and maintained by means of aqueous sodium carbonate solution) and at a temperature of 10 to 15° C. Stirring is continued for a while longer, and the resulting azo compound of the formula (written in the form of the free acid)

and the reaction is completed with continued stirring over about 4 hours while maintaining this pH and a temperature of 10 to 25° C. The coupling component thus prepared, 1-[2'-chloro-4'-(N-β-hydroxyethyl-N-benzyl)amino-1',3 ',5'-triazin-6'-yl]amino-3,6-disulfo-8-naphthol, is then isolated from the synthesis batch at a pH of 7 by salting out with sodium chloride.

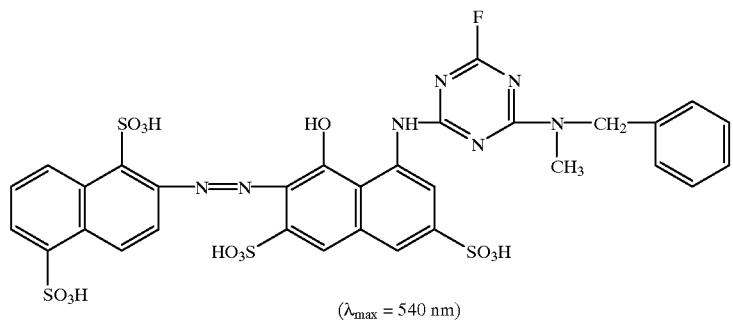

($\lambda_{max}$ = 540 nm)

is isolated in a conventional manner, for example by salting out with sodium chloride.

It possesses good fiber-reactive dye properties and affords on the fiber materials mentioned in the description part, especially cotton, dyeings and prints in a brilliant red shade having good fastness properties, of which the good wash-fastnesses may be emphasized in particular.

b) To a pH 7 suspension in 600 parts of ice-water of 29 parts of the precursor prepared under a) is added a hydrochloric acid diazonium salt solution prepared in a conventional manner from 19 parts of 2-aminonaphthalene-1,5,7-trisulfonic acid and the coupling reaction is carried out at a pH of 7 to 8 (which can be set and maintained by means of aqueous sodium carbonate solution) and at a temperature of 10 to 15° C. Stirring is continued for a little while longer and the resulting azo compound of the formula (written in the form of the free acid)

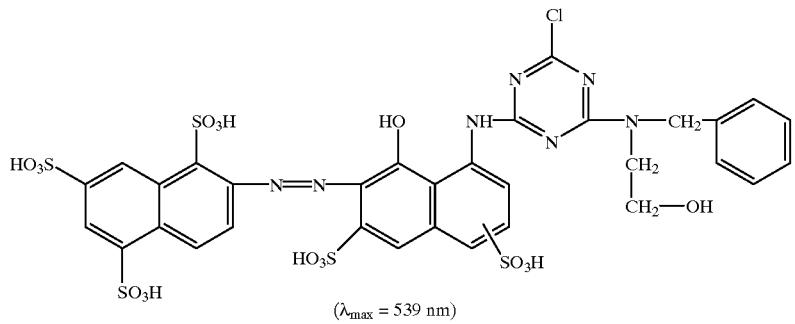

($\lambda_{max}$ = 539 nm)

Example 2 a) To a suspension of 32 parts of 1-amino-8-naphthol-3,6-disulfonic acid in 500 parts of ice-water are added 20 parts of 2,4,6-trichloro-1,3,5-triazine (cyanuric chloride) with thorough stirring at a temperature of about 0° C. and a pH between 1.0 and 2.5 and the reaction is completed over about 4 hours with continued stirring at about 0° C. and a pH between 1.0 and 2.5 (the pH can be maintained for example by addition of sodium bicarbonate). To this batch are added 15 parts of N-(β-hydroxyethyl)benzylamine, the pH is adjusted to 8 by means of aqueous sodium carbonate solution, is isolated in a conventional manner, for example by salting out with sodium chloride.

It possesses good fiber-reactive dye properties and affords on the fiber materials mentioned in the description part, especially cotton, dyeings and prints in a brilliant slightly bluish red shade having good fastness properties, of which the good washfastnesses may be emphasized in particular.

Example 3

To prepare a monoazo compound according to the invention, the directions of Example 2a) are followed to initially react 32 parts of 1-amino-8-naphthol-4,6-disulfonic acid with 20 parts of cyanuric chloride and then to react the resulting dichlorotriazinylamino-8-naphtholdisulfonic acid with 12 parts of N-methylbenzylamine. 27.5 parts of this coupling component are suspended in 500 parts of ice-water at pH 7 and coupled with thorough stirring at pH 7 to 8 and a temperature of 10 to 15° C. with a conventionally prepared hydrochloric acid suspension of the diazonium salt of 15 parts of 2-aminonaphthalene4,8-disulfonic acid. After the coupling reaction has ended, the novel compound of the formula (written in the form of the free acid)

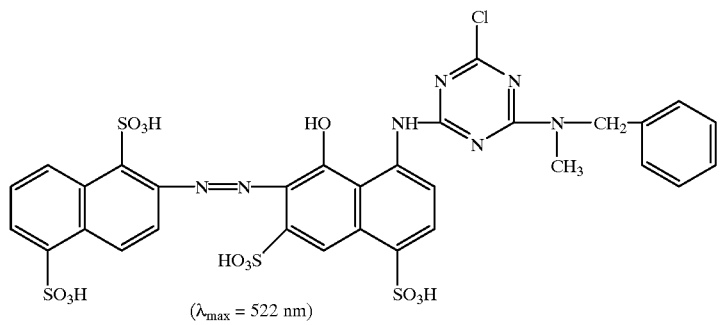

($\lambda_{max}$ = 522 nm)

is isolated in a conventional manner, for example by salting out with sodium chloride. Applied by the dyeing and printing processes customary in the art for fiber-reactive dyes, it dyes the fiber materials mentioned in the description part, especially cellulose fiber materials, such as cotton, in strong red shades having good fastness properties.

Examples 4 to 31

The table examples hereinbelow describe further novel monoazo compounds conforming to a general formula (A)

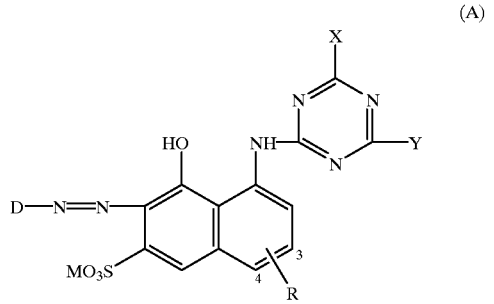

(A)

(where M is as defined for the formula (1)) in terms of their components. They can be prepared in a manner according to the invention, for example analogously to one of the above operative examples, from the starting compounds evident in the general formula (A) (the diazo component D-NH$_2$, cyanuric fluoride or cyanuric chloride, an amine of the general formula H-Y conforming to the general formula (4) in the description part and 1-amino-3,6- or 4,6-disulfo-8-naphthol). They possess very good fiber-reactive dye properties and, applied by the application processes customary in the art for fiber-reactive dyes, dye the fiber materials mentioned in the description part, especially cellulose fiber materials, in the hue reported (for cotton in this case) in the respective table example in high color strength and good fastnesses.

| | Monoazo compound (A) | | | | |
|---|---|---|---|---|---|
| Ex. | D | R | X | Y | Hue |
| 4 | 1,5,7-trisulfonaphth-2-yl | 3-sulfo | fluorine | N-methyl-N-benzyl-amino | red |
| 5 | 4,8-disulfonaphth-2-yl | 3-sulfo | fluorine | N-methyl-N-benzyl-amino | bluish red |
| 6 | 3,6,8-trisulfonaphth-2-yl | 3-sulfo | fluorine | N-methyl-N-benzyl-amino | bluish red |
| 7 | 6,8-disulfonaphth-2-yl | 3-sulfo | fluorine | N-methyl-N-benzyl-amino | bluish red |
| 8 | 4,6,8-trisulfonaphth-2-yl | 3-sulfo | fluorine | N-methyl-N-benzyl-amino | bluish red |

-continued

| Ex. | D | R | X | Y | Hue |
|---|---|---|---|---|---|
| 9 | 1-sulfonaphth-2-yl | 3-sulfo | fluorine | N-methyl-N-benzyl-amino | bluish red |
| 10 | 6,8-disulfonaphth-2-yl | 4-sulfo | chlorine | N-(β-hydroxyethyl)-N-benzylamino | bluish red |
| 11 | 1-sulfonaphth-2-yl | 4-sulfo | chlorine | N-(β-hydroxyethyl)-N-benzylamino | bluish red |
| 12 | 1,5-disulfonaphth-2-yl | 4-sulfo | chlorine | N-(β-hydroxyethyl)-N-benzylamino | red |
| 13 | 1,5-disulfonaphth-2-yl | 4-sulfo | fluorine | N-methyl-N-(4-methylbenzyl)amino | red |
| 14 | 1,5-disulfonaphth-2-yl | 4-sulfo | chlorine | N-methyl-N-benzyl-amino | red |
| 15 | 1,5-disulfonaphth-2-yl | 3-sulfo | fluorine | N-methyl-N-(4 methylbenzyl)amino | red |
| 16 | 1,5-disulfonaphth-2-yl | 3-sulfo | fluorine | N-methyl-N-(4-sulfo-benzyl)amino | red |
| 17 | 1,5-disulfonaphth-2-yl | 3-sulfo | fluorine | N-methyl-N-(3-methylbenzyl)-amino | red |
| 18 | 1,5,7-trisulfonaphth-2-yl | 4-sulfo | chlorine | N-methyl-N-benzyl-amino | red |
| 19 | 1,5,7-trisulfonaphth-2-yl | 3-sulfo | chlorine | N-(β-hydroxyethyl)-N-benzylamino | red |
| 20 | 1,5,7-trisulfonaphth-2-yl | 3-sulfo | fluorine | N-methyl-N-benzyl-amino | red |
| 21 | 1,5,7-trisulfonaphth-2-yl | 3-sulfo | fluorine | N-ethyl-N-benzyl-amino | red |
| 22 | 1,5,7-trisulfonaphth-2-yl | 4-sulfo | fluorine | N-methyl-N-(4-methylbenzyl)amino | red |
| 23 | 4,6,8-trisulfonaphth-2-yl | 3-sulfo | fluorine | N-methyl-N-benzyl-amino | red |
| 24 | 4,6,8-trisulfonaphth-2-yl | 3-sulfo | chlorine | N-(β-hydroxyethyl)-N-benzylamino | red |
| 25 | 4,6,8-trisulfonaphth-2-yl | 3-sulfo | chlorine | N-ethyl-N-benzyl-amino | red |
| 26 | 4,6,8-trisulfonaphth-2-yl | 3-sulfo | fluorine | N-(β-ethoxyethyl)-N-benzylamino | red |
| 27 | 4,6,8-trisulfonaphth-2-yl | 3-sulfo | chlorine | N-propyl-N-benzyl-amino | red |
| 28 | 4,6,8-trisulfonaphth-2-yl | 4-sulfo | chlorine | N-propyl-N-benzyl-amino | red |
| 29 | 4,6,8-trisulfonaphth-2-yl | 4-sulfo | chlorine | N-(β-hydroxyethyl)-N-benzylamino | red |
| 30 | 4,6,8-trisulfonaphth-2-yl | 4-sulfo | chlorine | N-methyl-N-benzyl-amino | red |
| 31 | 4,6,8-trisulfonaphth-2-yl | 4-sulfo | fluorine | N-methyl-N-benzyl-amino | red |

What is claimed is:

1. A monoazo compound of the general formula (1)

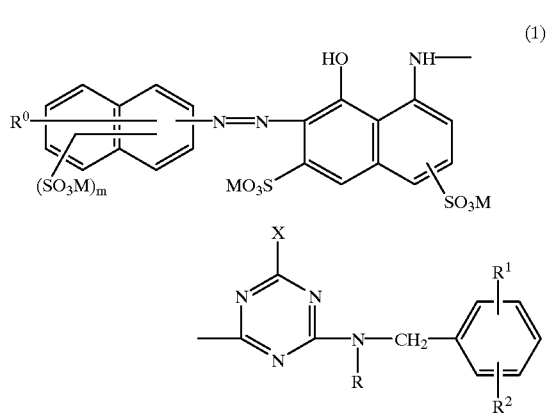

where:

M is hydrogen or an alkali metal;

m is 1, 2 or 3;

X is chlorine or fluorine;

$R^0$ is hydrogen or carboxyl;

R is alkyl of 1 to 4 carbon atoms or alkyl of 1 to 4 carbon atoms which is substituted by hydroxyl, carboxyl, sulfo, sulfato, phosphate, chlorine, alkanoyloxy of 2 to 5 carbon atoms or alkoxy of 1 to 4 carbon atoms;

$R^1$ is hydrogen, alkyl of 1 to 4 carbon atoms, which may be substituted, or is alkoxy of 1 to 4 carbon atoms, which may be substituted, or is alkanoylamino of 2 to 5 carbon atoms, optionally substituted benzoylamino or halogen;

$R^2$ is hydrogen, carboxyl or sulfo; the one —$SO_3M$ group in the aminonaphthol radical is disposed meta or para relative to the amino group.

2. The monoazo compound of claim 1, conforming to the general formula (2)

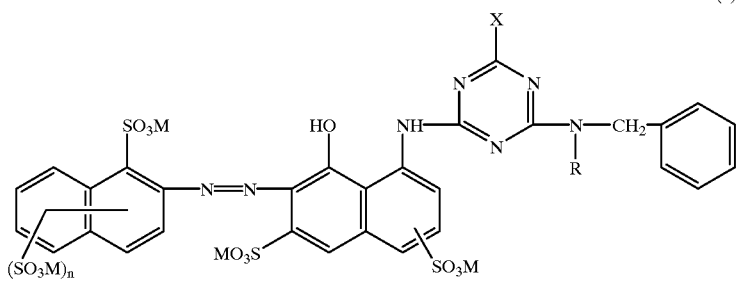
(2)

where
R is methyl, ethyl or β-hydroxyethyl,
n is zero, 1 or 2 (when n is zero, this group is hydrogen),
and the other elements of the formula are each as defined in claim 1.

3. The monoazo compound of claim 1, wherein $R^1$ is hydrogen.

4. The monoazo compound of claim 1, wherein $R^2$ is hydrogen.

5. The monoazo compound of claim 1, wherein X is fluorine.

6. The monoazo compound of claim 1, wherein R is methyl.

7. The monoazo compound of claim 1, wherein the one —$SO_3M$ group in the aminonaphthol radical is disposed meta relative to the amino group.

8. The monoazo compound of claim 1, wherein the azo group attaches to the sulfonaphthyl radical in the β-position of the naphthalene radical.

9. The monoazo compound of claim 3, wherein $R^2$ is hydrogen.

10. The monoazo compound of claim 9, wherein X is fluorine.

11. The monoazo compound of claim 10, wherein R is methyl.

12. The monoazo compound of claim 11, wherein the one —$SO_3M$ group in the aminonaphthol radical is disposed meta relative to the amino group.

13. The monoazo compound of claim 12, a wherein the azo group attaches to the sulfonaphthyl radical in the deposition of the naphthalene radical.

14. A process for preparing a monoazo compound of claim 1, which comprises coupling a diazonium salt of an amine of the general formula (4)

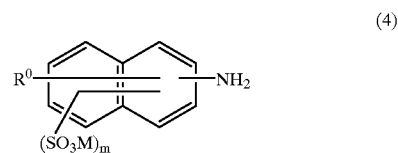
(4)

where $R^0$, M and m are each as defined in claim 1, with a compound of the general formula (5)

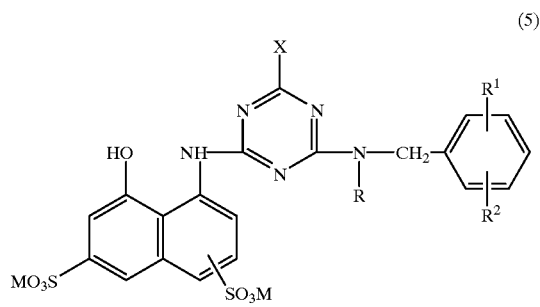
(5)

where M, X, R, $R^1$ and $R^2$ are each as defined in claim 1 and the one —$SO_3M$ group is disposed meta or para relative to the amino group of the aminonaphthol radical.

15. A process for dyeing hydroxyl- and/or carboxamido-containing material, which comprises applying a dye which contains the compound as claimed in claim 1 to the material and fixing the dye on the material by means of heat with the aid of an alkaline agent or by means of both measures.

* * * * *